United States Patent
Thomas (10) Patent No.: US 10,198,032 B2
(45) Date of Patent: *Feb. 5, 2019

(54) PASSIVE LOCATORS FOR A VIRTUAL REALITY HEADSET

(71) Applicant: Oculus VR, LLC, Menlo Park, CA (US)

(72) Inventor: Matt Lee Thomas, Buena Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,624

(22) Filed: Apr. 18, 2017

(65) Prior Publication Data

US 2017/0220064 A1 Aug. 3, 2017

Related U.S. Application Data

(63) Continuation of application No. 14/596,775, filed on Jan. 14, 2015, now Pat. No. 9,659,411.

(51) Int. Cl.
*G09G 5/00* (2006.01)
*G06F 1/16* (2006.01)
(Continued)

(52) U.S. Cl.
CPC .............. *G06F 1/163* (2013.01); *G02B 5/12* (2013.01); *G02B 27/017* (2013.01); *G02B 27/0172* (2013.01); *G02B 27/0179* (2013.01); *G06F 1/1637* (2013.01); *G06F 1/1686* (2013.01); *G06F 3/012* (2013.01); *G06T 7/73* (2017.01); *G06T 19/006* (2013.01); *G02B 2027/014* (2013.01); *G02B 2027/0138* (2013.01); *G02B 2027/0187* (2013.01); *G06T 7/246* (2017.01);
(Continued)

(58) Field of Classification Search
USPC .................... 345/8, 156, 173, 633; 348/14.08
See application file for complete search history.

(56) References Cited

U.S. PATENT DOCUMENTS 5,856,844 A * 1/1999 Batterman .............. G01S 5/163
345/158
2005/0175218 A1 8/2005 Vertegaal et al.
(Continued)

OTHER PUBLICATIONS

U.S. Appl. No. 62/088,085, filed Dec. 5, 2014, 63 Pages.
(Continued)

*Primary Examiner* — Thuy N Pardo
(74) *Attorney, Agent, or Firm* — Fenwick & West LLP (57) ABSTRACT

A virtual reality (VR) headset includes a plurality of marker groups each corresponding to a different location on the VR headset. Each marker group includes one or more passive locators having positions relative to each other. Passive locators included in a marker group are configured to reflect one or more bands of light emitted by a source device. A VR system determines positions of passive locators relative to each other in a marker group and bands of light reflected by the passive locators included in the marker group to determine a location on the VR headset. Based on the location on the VR headset, the VR system determines a position of the VR headset and identifies content to provide to the VR headset.

18 Claims, 3 Drawing Sheets

(51) Int. Cl.
    *G06T 19/00*     (2011.01)
    *G02B 27/01*     (2006.01)
    *G02B 5/12*     (2006.01)
    *G06T 7/73*     (2017.01)
    *G06F 3/01*     (2006.01)
    *G06T 7/246*     (2017.01)

(52) U.S. Cl.
    CPC ............... *G06T 2207/10048* (2013.01); *G06T 2207/30204* (2013.01)

(56) References Cited

U.S. PATENT DOCUMENTS

| | | | |
|---|---|---|---|
| 2009/0033607 A1* | 2/2009 | Fergason | G02B 5/3083 345/89 |
| 2012/0182206 A1* | 7/2012 | Cok | G02B 27/017 345/8 |
| 2013/0050258 A1 | 2/2013 | Liu et al. | |
| 2013/0127980 A1* | 5/2013 | Haddick | G06F 3/013 348/14.08 |
| 2013/0137076 A1 | 5/2013 | Perez et al. | |
| 2013/0176350 A1* | 7/2013 | Fergason | G02B 5/3083 345/690 |
| 2013/0278631 A1* | 10/2013 | Border | G02B 27/017 345/633 |
| 2014/0139453 A1 | 5/2014 | Yu et al. | |
| 2014/0152531 A1 | 6/2014 | Murray et al. | |
| 2014/0225915 A1 | 8/2014 | Theimer et al. | |
| 2014/0253437 A1 | 9/2014 | Vaught et al. | |
| 2014/0340424 A1* | 11/2014 | Ellsworth | G02B 27/0172 345/633 |
| 2014/0361977 A1 | 12/2014 | Stafford et al. | |
| 2014/0368533 A1 | 12/2014 | Salter et al. | |
| 2014/0368535 A1 | 12/2014 | Salter et al. | |
| 2014/0372957 A1 | 12/2014 | Keane et al. | |
| 2015/0049081 A1 | 2/2015 | Coffey et al. | |
| 2015/0049083 A1 | 2/2015 | Bidne et al. | |
| 2015/0062161 A1 | 3/2015 | Kim et al. | |
| 2015/0145985 A1 | 5/2015 | Gourlay et al. | |
| 2015/0186728 A1 | 7/2015 | Kimura | |
| 2015/0193983 A1* | 7/2015 | Katz | G02B 27/017 345/419 |
| 2015/0248793 A1* | 9/2015 | Abovitz | G06K 9/00671 345/633 |
| 2015/0261291 A1* | 9/2015 | Mikhailov | G06F 3/012 345/156 |
| 2015/0294505 A1 | 10/2015 | Atsmon | |
| 2016/0054837 A1* | 2/2016 | Stafford | A63F 13/825 463/33 |
| 2016/0070103 A1* | 3/2016 | Yoon | G02B 3/08 345/633 |
| 2016/0110920 A1* | 4/2016 | Schowengerdt | G06T 7/73 345/633 |
| 2016/0140930 A1* | 5/2016 | Pusch | G06F 3/011 345/633 |
| 2016/0195718 A1* | 7/2016 | Evans | G02B 5/0294 345/8 |

OTHER PUBLICATIONS

U.S. Appl. No. 62/088,088, filed Dec. 5, 2014, 66 Pages.
United States Office Action, U.S. Appl. No. 14/596,775, dated Sep. 28, 2016, eight pages.
United States Office Action, U.S. Appl. No. 14/596,775, dated May 19, 2016, eight pages.

* cited by examiner

PASSIVE LOCATORS FOR A VIRTUAL REALITY HEADSET

CROSS REFERENCE TO RELATED APPLICATIONS

This application is a continuation of co-pending U.S. application Ser. No. 14/596,775, filed Jan. 14, 2015, which is incorporated herein by reference in its entirety.

BACKGROUND

The present disclosure generally relates to virtual reality headsets, and specifically relates to passive locators on a virtual reality headset.

Virtual reality (VR) systems include components for determining position and movement of a VR headset worn by a user. Conventional VR systems determine position and movement of a VR headset through active devices (e.g., light emitting diodes) that emit light used by the VR system to track the location of the VR headset. However, using active components increases the complexity of design and manufacture of VR headsets.

SUMMARY

A virtual reality (VR) system includes a VR headset, a source device, an imaging device, and a VR console. The VR headset includes an electronic display configured to present content to a user of the VR headset. Additionally, the VR headset includes a plurality of marker groups, each marker group comprising one or more passive locators and corresponding to a different location on the VR headset. The source device illuminates the VR headset, and the imaging device captures a series of images of the VR headset. At least one image of the series of images includes a marker group that has been illuminated by the imaging device. The VR console receives the series of images from the imaging device and, based at least in part on the reflectance configuration of the marker group included in the series of images, determines a location on the VR headset that corresponds to the marker group included in the series of images. Based on the determined location on the VR headset corresponding to the marker group, the VR console determines a position of the VR headset. Using the determined position of the VR headset, the VR console updates content and provides the updated content to the VR headset.

Each marker group on a VR headset has a unique reflectance configuration. The reflectance configuration of a marker group describes a spatial configuration (e.g., a number and arrangement of passive locators) of passive locators within the marker group and describes a reflectance type for each of the passive locators within the marker group. The reflectance type of a passive locator describes a particular band of light (e.g., a set of wavelengths of light) reflected by the passive locator. In some embodiments, at least one marker group on the VR headset includes two or more passive locators having differing reflectance types.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
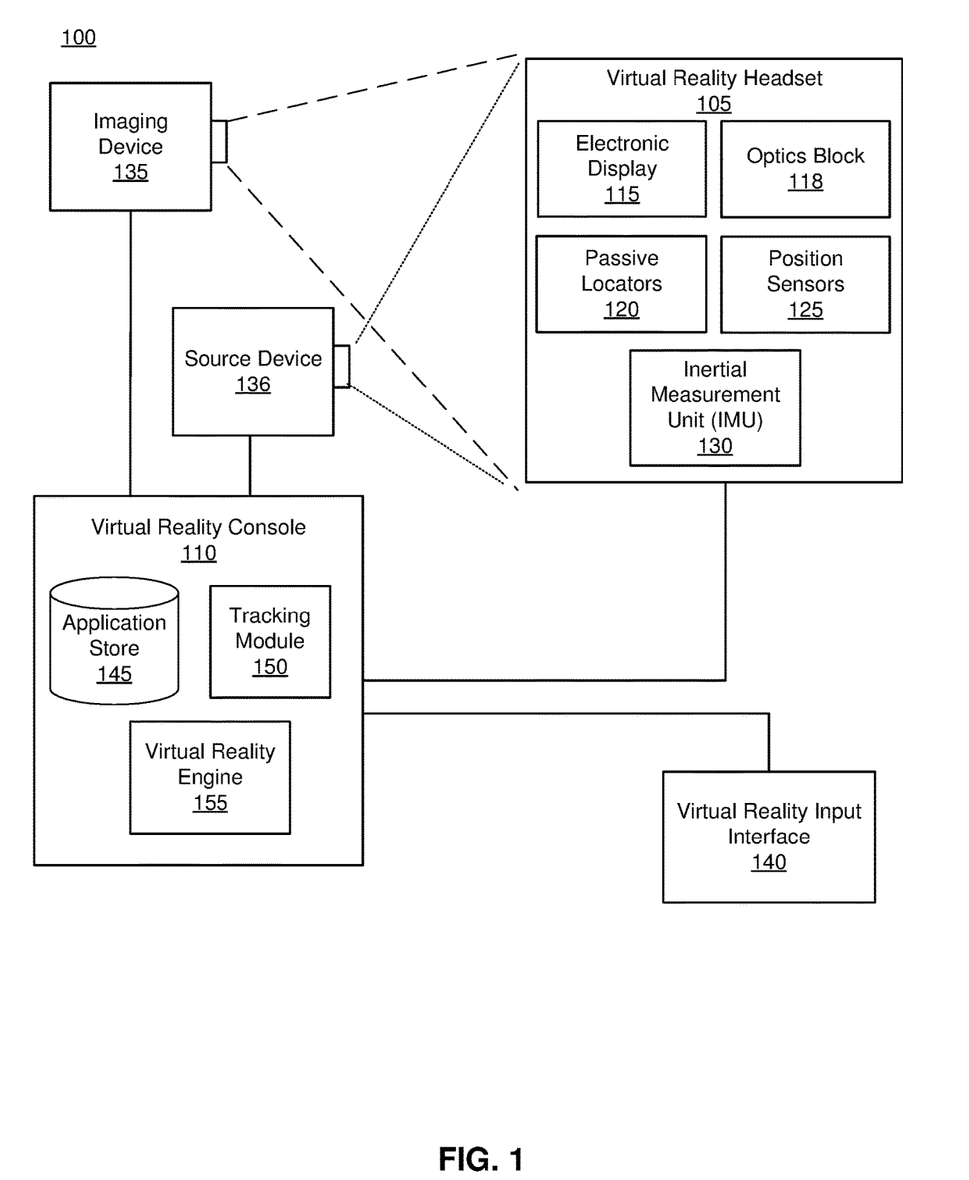
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, a source device 136, and a VR input interface 140 that are each coupled to the VR console 110. While FIG. 1 shows an example system 100 including one VR headset 105, one imaging device 135, one source device 136, and one VR input interface 140, in other embodiments any number of these components may be included in the system environment 100. For example, there may be multiple VR headsets 105 that are each illuminated by at least one source device 136, with each VR headset 105 having an associated VR input interface 140 and monitored by one or more imaging devices 135. In the preceding example, each VR headset 105, VR input interface 140, source devices 136, and imaging device 135 communicates with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIG. 2. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more passive locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received light, corrects optical errors associated with the image light, and presents the corrected image light to a user of the VR headset 105. In various embodiments, the optics block 118 includes one or more optical elements. Example optical elements included in the optics block 118 include: an aperture, a Fresnel lens, a convex lens, a concave lens, a filter, or any other suitable optical element that affects image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the content presented by the electronic display 115. For example, the field of view of the displayed content is such that the displayed content is presented using almost all (e.g., 110 degrees diagonal), and in some cases all, of the user's field of view. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The passive locators 120 are reflective objects located in specific positions on the VR headset 105 relative to one another and relative to a specific reference point on the VR headset 105. Each passive locator 120 has a reflectance type characterizing a band of light (e.g., a range of wavelengths of light) reflected by the passive locator 120. In some embodiments, each passive locator 120 has a common reflectance type. In other embodiments, various passive locators 120 have different reflectance types. For example, a passive locator 120 has a reflectance type indicating the passive locator 120 reflects light in the visible band (~380 nm to 750 nm), a passive locator has a reflectance type indicating the passive locator 120 reflects light in the infrared (IR) band (~750 nm to 1 mm), a passive locator has a reflectance type indicating the passive locator 120 reflects light in the ultraviolet band (10 nm to 380 nm), or a passive locator has a reflectance type indicating the passive locator 120 reflects light some other portion of the electromagnetic spectrum, or some combination thereof.

The passive locators 120 are divided into various marker groups that each include at least one passive locator 120. In various embodiments, marker groups may be placed on various components of the VR headset 105. For example, marker groups may be placed on one or more rigid bodies in the VR headset 105, a strap in the VR headset 105, etc. A marker group is associated with a unique location on the VR headset 105 and is formed by a unique reflectance configuration of one or more passive locators 120. The reflectance configuration of a marker group describes a spatial configuration (a number and an arrangement) of passive locators 120 within the marker group and reflectance types of passive locators 120 at different positions within the marker group (e.g., at each position within the marker group). Accordingly, the reflectance configuration of a marker group describes an arrangement (e.g., passive locators 120 arranged in a triangle, an inverted triangle, a right triangle, a diamond, a vertical line, a horizontal line, some other arrangement, etc.) and reflectance types of each passive locator 120 within the marker group. A marker group is associated with a unique location on the VR headset 105; different VR headsets 105 may include different marker groups associated with different locations. Hence, on a VR headset 105 including marker groups of passive locators 120 each having a common reflectance type, each marker group has a unique spatial configuration, causing each marker group to have a unique reflectance configuration. If a VR headset 105 includes passive locators 120 having differing reflectance types, marker groups having a common spatial configuration may be used on the VR headset 105 provided the reflectance configuration for each marker group is unique. For example, each marker group may be a single passive locator 120 that reflects a unique band of light. Example marker groups are further discussed below with reference to FIGS. 3A and 3B.

In some embodiments, the passive locators 120 are located beneath an outer surface of the VR headset 105, which is transparent to the wavelengths of light emitted by the source 136 and is thin enough to prevent substantial attenuation of the wavelengths of light reflected by the passive locators 120. Additionally, in some embodiments, the outer surface or other portions of the VR headset 105 are opaque in the visible band of wavelengths of light. Thus, the passive locators 120 may reflect light in the IR band under an outer surface that is transparent in the IR band but opaque in the visible band.

The IMU 130 is an electronic device that generates fast calibration data indicating an estimated position of the VR headset 105 relative to an initial position of the VR headset 105 based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals generated by the one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the VR headset 105 from the sampled data. For example, the IMU 130 integrates the measurement signals received from one or more accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the passive locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., for increasing signal to noise ratio). The imaging device 135 is configured to detect light reflected from passive locators 120 in a field of view of the imaging device 135. In some embodiments, the imaging device 135 may include a light source that illuminates some or all of the passive locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The source device 136 is a light source that illuminates some or all of the passive locators 120. Examples of the source device 136 include: one or more light emitting diodes, one or more lamps, some other light source, or some combination thereof. The source device 136 may emit light in the visible band, in the IR band, in the ultraviolet band, in some other portion of the electromagnetic spectrum, or in some combination thereof. In some embodiments, the VR headset 105 may be illuminated by multiple source devices 136; different source devices 136 may emit different bands of light. While FIG. 1 shows an embodiment where the source device 136 is distinct from the imaging device 135, in other embodiments the source device 136 is included in the imaging device 135.

The VR input interface 140 is a device that allows a user to send action requests to the VR console 110. An action request is a request to perform a particular action. For example, an action request may be to start or to end an application or to perform a particular action within the application. The VR input interface 140 may include one or more input devices. Example input devices include: a keyboard, a mouse, a game controller, a joystick, a yoke, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides content to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different components than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR interface device 140. Examples of applications include: gaming applications, conferencing applications, video playback application, or other suitable applications.

The tracking module 150 calibrates the system environment 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100. Calibration and tracking is further described in provisional U.S. Patent Application No. 62/088,085, filed on Dec. 5, 2014 and provisional U.S. Patent Application No. 62/088,088, filed on Dec. 5, 2014, both of which are hereby incorporated by reference.

The tracking module 150 tracks movements of the VR headset 105 using slow calibration information from the imaging device 135. For example, the tracking module 150 determines positions of a reference point of the VR headset 105 using observed locators 120 from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof, of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
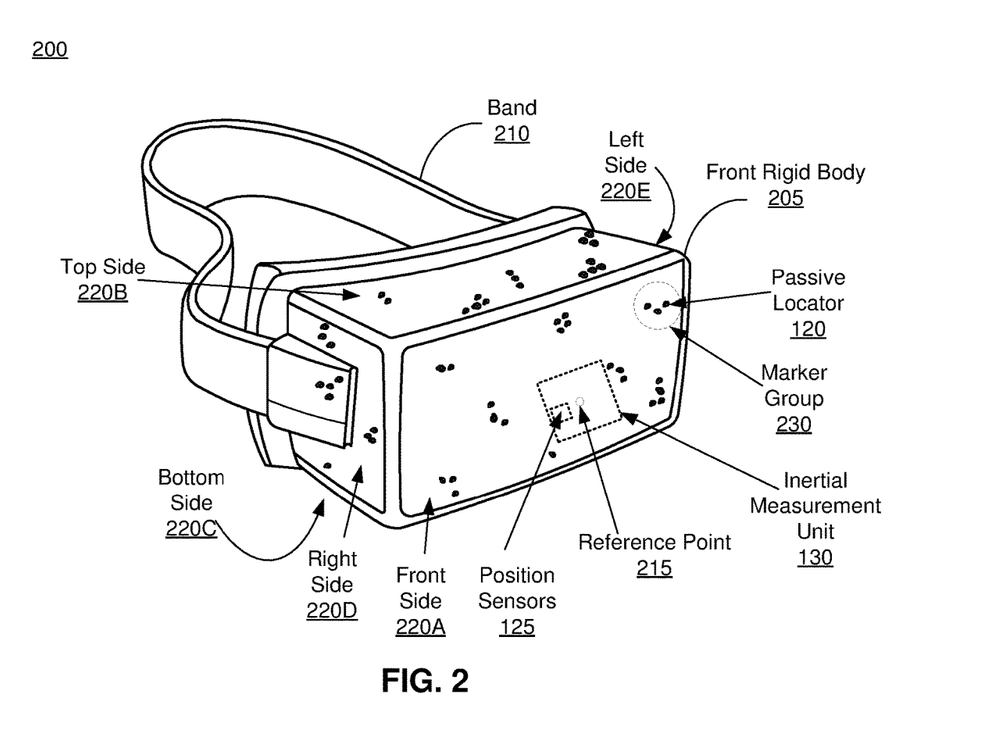
FIG. 2 is a wire diagram of a virtual reality headset, in accordance with an embodiment.

FIG. 2 is a wire diagram of a virtual reality (VR) headset 200, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125 and marker groups 230. In the embodiment shown by FIG. 2, the position sensors 125 are located within the IMU 130, and neither the IMU 130 nor the position sensors 125 are visible to the user.

Each marker group 230 includes one or more passive locators 120 that are located in fixed positions on the front rigid body 205 relative to one another and relative to a reference point 215. In the example of FIG. 2, the reference point 215 is located at the center of the IMU 130. The passive locators 120 within each marker group 230 reflect light from a source device 136 that is detectable by the imaging device 135. Each marker group 230 has a unique reflectance configuration based on a combination of spatial configuration and reflectance types for passive locators 120 within each marker group 230. Marker groups 230 are located on a front side 220A, a top side 220B, a bottom side 220C, a right side 220D, and a left side 220E of the front rigid body 205 in the example of FIG. 2. Marker groups 230 located on different sides of the front rigid body 205 may have different reflectance configurations, allowing the reflectance configuration of a marker group 230 to identify a side of the front rigid body 205. As discussed above, the VR console 110 may use one or more marker groups 230 to identify an orientation of the VR headset 105.

Figure 3A:
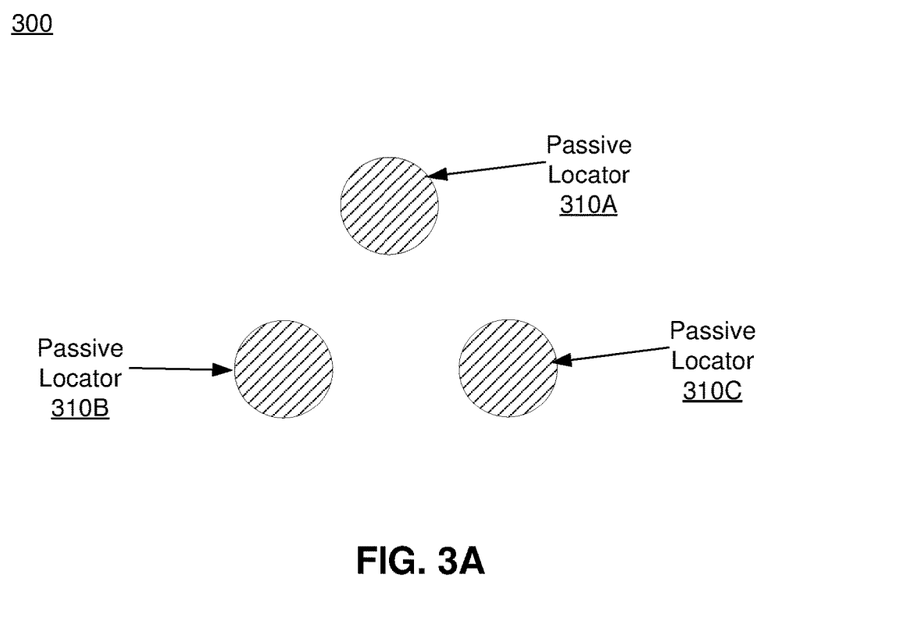
FIG. 3A is an example marker group for the virtual reality headset shown in FIG. 2, in accordance with an embodiment.

FIG. 3A is an example marker group 300 for the VR headset 200 shown in FIG. 2. In the example shown by FIG. 3A, the marker group 300 has a spatial configuration specifying three passive locators 310A, 310B, and 310C arranged in a triangle. In this example, each passive locator 310A, 310B, 310C has a common reflectance type (illustrated by the diagonal hash in FIG. 3A). As described above in conjunction with FIGS. 1 and 2, the spatial configuration and reflectance types of the passive locators 310A, 310B, 310C describe a unique reflectance configuration that may be associated with a single position on the front rigid body 205 of the VR headset 200.

Figure 3B:
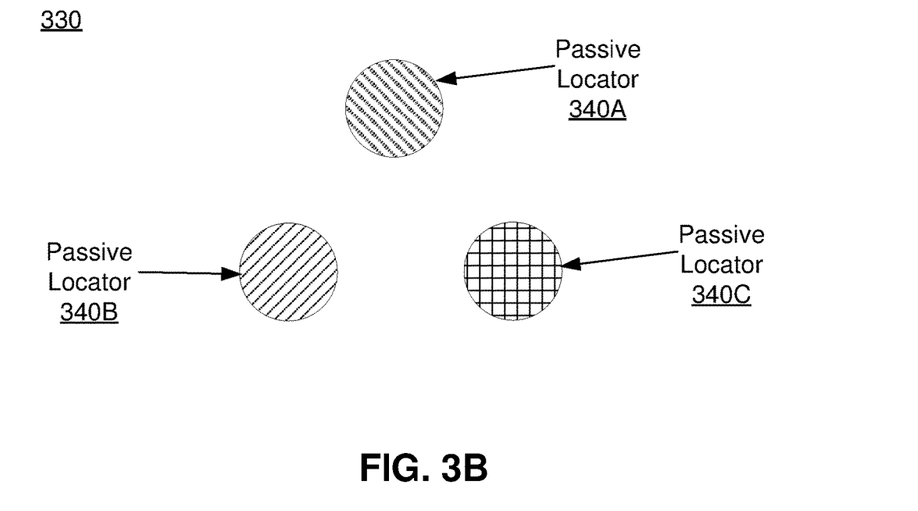
FIG. 3B is another example marker group for the virtual reality headset shown in FIG. 2, in accordance with an embodiment.

FIG. 3B is another example marker group 330 for the VR headset 200 shown in FIG. 2. In the example of FIG. 3B, the marker group 230 has a spatial configuration specifying three passive locators 340A, 340B, and 340C arranged in a triangle. Additionally, each passive locators 340A, 340B, 340C has a different reflectance type (illustrated by the different fill of each passive locator 340A, 340B, 340C in FIG. 3B). The marker group 330 may be associated with a single position on the front rigid body 205 of the VR headset 200 different than the position associated with the marker group 300.

Summary

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A virtual reality (VR) headset comprising:
   an electronic display configured to present content to a user of the VR headset; and
   a plurality of marker groups, each marker group corresponding to a different location on the VR headset and comprising one or more passive locators having positions relative to each other, each passive locator having a respective reflectance type, that identities a band of light of a plurality of different bands of light, and the band of light is reflected by the passive locator, and each marker group has a unique reflectance configuration that describes a spatial configuration of the one or more passive locators within the marker group and one or more reflectance types of the one or more passive locators within the marker group.

2. The VR headset of claim 1, wherein the band of light of the plurality of different bands is in the infrared.

3. The VR headset of claim 1, wherein at least one marker group includes at least two passive locators having different reflectance types.

4. The VR headset of claim 1, wherein the plurality of marker groups includes at least two marker groups including passive locators having common positions relative to each other.

5. The VR headset of claim 1, wherein the plurality of marker groups includes at least two marker groups that have passive locators having a common reflectance type.

6. The VR headset of claim 5, wherein the at least two marker groups include passive locators having different positions relative to each other.

7. The VR headset of claim 1 further comprising a source device external to the VR headset, the source device configured to illuminate the VR headset.

8. The VR headset of claim 7, wherein the source device emits light in one of: a visible band, an infrared band, the ultraviolet band, and some combination thereof.

9. The VR headset of claim 7, wherein the source device is configured to illuminate at least one of the one or more passive locators associated with the VR headset.

10. The VR headset of claim 1 further comprising an imaging device configured to capture a series of images of the VR headset.

11. The VR headset of claim 9 wherein each of the one or more passive locators is configured to retro-reflect light towards an imaging device associated with the VR system.

12. A virtual reality (VR) system comprising:
an electronic display configured to receive content from a VR system, and present the content to a user of the VR headset;
a plurality of marker groups, each marker group corresponding to a different location on the VR headset and comprising one or more passive locators having positions relative to each other, each passive locator having a respective reflectance type that identities a band of light of a plurality of different bands of light, and the band of light is reflected by the passive locator, and wherein each marker group has a unique reflectance configuration that describes a number and a spatial configuration of the one or more passive locators within the marker group and one or more reflectance types of the one or more passive locators; and
an imaging device configured to capture a series of images of the VR headset, the series of images including at least one of the plurality of marker groups wherein the reflectance configuration of each of the marker groups in the captured series of images determines a location on the VR headset that corresponds to the marker group.

13. The VR system of claim 12, wherein at least one marker group includes at least two passive locators having different reflectance types.

14. The VR system of claim 12, wherein the plurality of marker groups includes at least two marker groups including passive locators having common positions relative to each other.

15. The VR system of claim 12, wherein the plurality of marker groups includes at least two marker groups that have passive locators having a common reflectance type.

16. The VR system of claim 12, wherein the at least two marker groups include passive locators having different positions relative to each other.

17. The VR system of claim 12 further comprising a source device external to the VR headset, the source device configured to illuminate the VR headset including at least one of the one or more passive locators.

18. The VR system of claim 12 wherein each of the one or more passive locators is configured to retro-reflect light towards the imaging device.

\* \* \* \* \*

UNITED STATES PATENT AND TRADEMARK OFFICE
CERTIFICATE OF CORRECTION

PATENT NO. : 10,198,032 B2
APPLICATION NO. : 15/490624
DATED : February 5, 2019
INVENTOR(S) : Matt Lee Thomas

It is certified that error appears in the above-identified patent and that said Letters Patent is hereby corrected as shown below:

In the Claims

Column 8, Claim 1, Line 8, delete "that identities a band" and insert -- that identifies a band --.

Column 9, Claim 12, Line 9, delete "that identities a band" and insert -- that identifies a band --.

Signed and Sealed this
Twenty-fifth Day of June, 2019

Andrei Iancu
*Director of the United States Patent and Trademark Office*